(12) United States Patent
Yoo

(10) Patent No.: US 8,931,931 B2
(45) Date of Patent: Jan. 13, 2015

(54) SOFT BOX WITH ZIPPER MOUNTED THEREON FOR IMPROVING HEAT RESISTANCE

(71) Applicant: Jae Kyun Yoo, Seoul (KR)

(72) Inventor: Jae Kyun Yoo, Seoul (KR)

(73) Assignee: Hyundai Fomex Co., Ltd., Seoul (KR)

( * ) Notice: Subject to any disclaimer, the term of this patent is extended or adjusted under 35 U.S.C. 154(b) by 71 days.

(21) Appl. No.: 13/871,274

(22) Filed: Apr. 26, 2013

(65) Prior Publication Data

US 2013/0286665 A1    Oct. 31, 2013

(30) Foreign Application Priority Data

Apr. 26, 2012  (KR) .................. 10-2012-0043769

(51) Int. Cl.
*F21V 7/22*  (2006.01)
(52) U.S. Cl.
CPC ....................................... *F21V 7/22* (2013.01)
USPC .............. 362/341; 362/16; 362/357; 362/358

(58) Field of Classification Search
USPC ........... 362/16, 341, 345, 346, 355, 356, 357, 362/358
See application file for complete search history.

(56) References Cited

U.S. PATENT DOCUMENTS

| 5,556,186 A * | 9/1996 | Pilby ............................... 362/16 |
| 6,030,087 A * | 2/2000 | Whittle ........................... 362/18 |
| 2002/0075666 A1 * | 6/2002 | Shirilla et al. ................... 362/16 |

* cited by examiner

*Primary Examiner* — David V Bruce
(74) *Attorney, Agent, or Firm* — IPLA P.A.; James E. Bame

(57) ABSTRACT

Provided is a soft box having a plurality of poles, an adapter ring having a plurality of holes into which the plurality of poles is correspondingly coupledly inserted, and a reflecting cloth adapted to connect the plurality of poles in such a manner as to reflect light therefrom, the soft box including: a zipper mounted on the reflecting cloth between the neighboring poles; and an auxiliary reflecting cloth disposed on the reflecting cloth adjacent to the inner side of the zipper along the longitudinal direction of the zipper in such a manner as to cover the inner surface of the zipper.

5 Claims, 3 Drawing Sheets

SOFT BOX WITH ZIPPER MOUNTED THEREON FOR IMPROVING HEAT RESISTANCE

CROSS REFERENCES

Applicant claims foreign priority under Paris Convention to Korean Patent Application No. 10-2012-0043769, filed 26 Apr. 2012, with the Korean Intellectual Property Office, where the entire contents are incorporated herein by reference.

BACKGROUND OF THE INVENTION

1. Field of the Invention

The present invention relates to a soft box with a zipper mounted thereon for improving heat resistance, and more particularly, to a soft box with a zipper mounted thereon for improving heat resistance that allows the coupling between poles and an adapter ring to be easily carried out by means of the zipper and that prevents the heat generated from an lighting lamp from being transmitted to the zipper, thereby preventing the damage of the zipper due to the heat.

2. Background of the Related Art

A speedlight is a device widely used to obtain the texture expression of an object and the representation of accurate colors of the object with an abundant quantity of light when the pictures of a person's whole body, half body, and identification or the pictures of the samples for advertisement of a variety of products are taken indoors.

A lighting method carried out through the speedlight used to obtain a good quality of pictures upon shooting is largely divided into direct lighting, diffusing lighting, and reflecting lighting.

That is, the direct lighting is carried out by directly irradiating the light emitted from the speedlight onto an object, and the diffusing lighting is carried out by covering a lighting lamp of the speedlight or the whole surface thereof with a thin cloth or a film similar thereto (which is called a "soft box") and irradiating the diffused light made through the diffusion of the light transmitted to the soft box on the object. Further, the reflecting lighting is carried out by installing an umbrella-shaped reflector specially made by coating a reflective material thereon when a large irradiation angle is needed in relatively small space, at the front of the speedlight, reflecting the emitted light to a large angle, and irradiating the light to the object over a large range.

The soft box is made by taking a fabric to a square or octagonal trumpet-like shape, and in this case, the fabric is made by coating a color temperature adjusting pigment on high-quality yarns for which tearing strength, tensile strength, degree of light transmittance, frictional force and the like are tested.

As shown in FIG. 1, a soft box 1 in the conventional practice is mounted on the speedlight in such a manner where the ends 3a of a plurality of poles 3 exposed from a fabric 2 covered on the soft box 1 are insertedly fitted one by one to pole insertion holes 13a equally spaced apart from each other on an adapter ring 13, thereby taking a square or octagonal trumpet-like shape. Next, the adapter ring 13 is fitted to the front end periphery 11a of the speedlight and fastened thereto by means of a fastening bolt 14.

So as to obtain the square or octagonal trumpet-like shape in a state of being tensely stretched out, however, the conventional soft box 1 should perform a first process wherein the exposed ends 3a of the poles 3 are fitted to the adapter ring 13 one by one, and in the fitting process of the poles 3 to the pole insertion holes 13a of the adapter ring 13, an elastic force is applied to the ends 3a of the poles 3 to a gradually strong degree, so that a substantially very strong force is needed at the time when the final end 3a is fitted to the corresponding pole insertion hole 13a. Because the ends 3a of the poles 3 are not well fitted to the pole insertion holes 13a of the adapter ring 13 due to the strong elastic forces, furthermore, the ends 3a of the poles 3 spring up, thereby making a user pricked, scratched, or severely damaged.

Moreover, the conventional soft box 1 should perform a second process wherein the assembled soft box 1 is fitted to the front end periphery of the speedlight 11 through the adapter ring 13 and then, the adapter ring 13 and the speedlight 11 are fastened to each other by means of the fastening bolt 14.

Accordingly, the conventional soft box 1 inconveniently needs both of the first and second processes in mounting the soft box 1 on the front end periphery of the speedlight 11, and further it needs a substantially strong force in the first process where the exposed ends 3a of the poles 3 are fitted to the pole insertion holes 13a of the adapter ring 13 one by one so as to obtain the square or octagonal trumpet-like shape in a state of being tensely stretched out. In some cases, furthermore, the ends 3a of the poles 3 spring up, thereby making the user damaged.

Accordingly, methods for easily assembling and disassembling the soft box with no application of strong force have been recently developed and proposed.

For example, as shown in FIG. 2, the conventional soft box is simple in structure and freely folded or unfolded, thereby providing many conveniences in treatment. Additionally, a zipper is mounted on a cloth disposed between poles, thereby allowing the soft box to be easily mounted and separated on/from the speedlight.

In this case, however, the light emitted from a light source is lost by means of the portion occupied by the zipper, thereby making it hard to provide the diffused light transmitted through the soft box with an abundant quantity.

SUMMARY OF THE INVENTION

Accordingly, the present invention has been made in view of the above-mentioned problems occurring in the prior art, and it is an object of the present invention to provide a soft box with a zipper mounted thereon for improving heat resistance that allows the coupling between poles and an adapter ring to be easily carried out by means of the zipper and that prevents the heat generated from a lighting lamp from being transmitted to the zipper, thereby preventing the damage of the zipper due to the heat.

To accomplish the above object, there is provided a soft box having a plurality of poles, an adapter ring having a plurality of holes into which the plurality of poles is correspondingly coupledly inserted, and a reflecting cloth adapted to connect the plurality of poles in such a manner as to reflect light therefrom, the soft box including: a zipper mounted on the reflecting cloth between the neighboring poles; and an auxiliary reflecting cloth disposed on the reflecting cloth adjacent to the inner side of the zipper along the longitudinal direction of the zipper in such a manner as to cover the inner surface of the zipper.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a soft box with a zipper mounted thereon for improving heat resistance (hereinafter, which is referred simply as 'soft box') according to the present invention will be in detail given with reference to the attached drawing.

Figure 1:
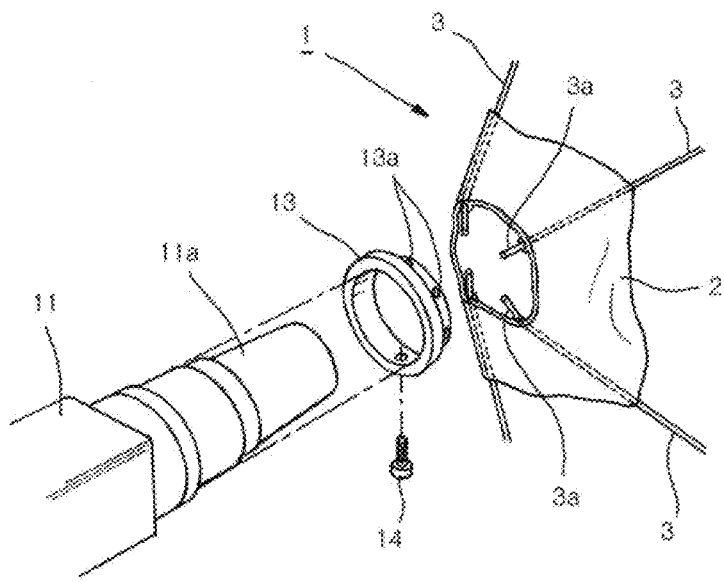
FIG. 1 is a perspective view showing an example of a soft box in a conventional practice.
Figure 2:
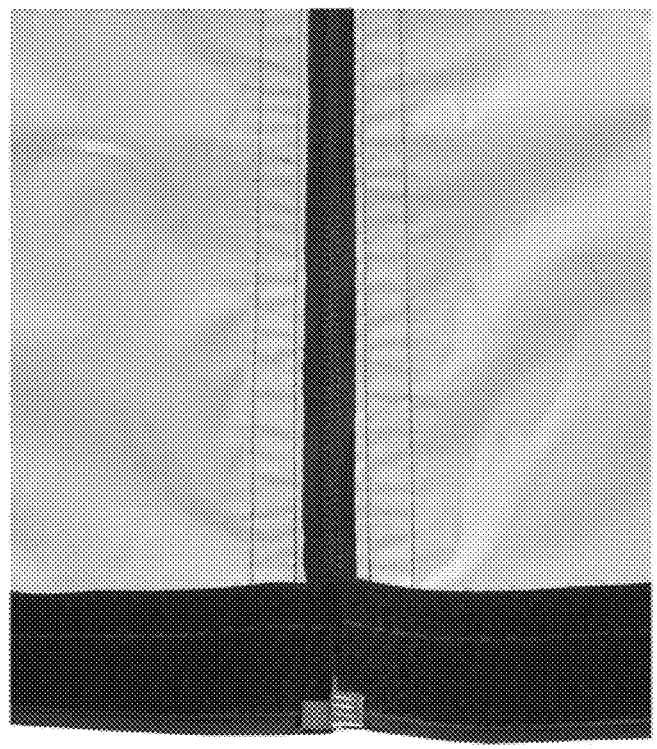
FIG. 2 is a photograph showing another example of a soft box in the conventional practice.
Figure 3:
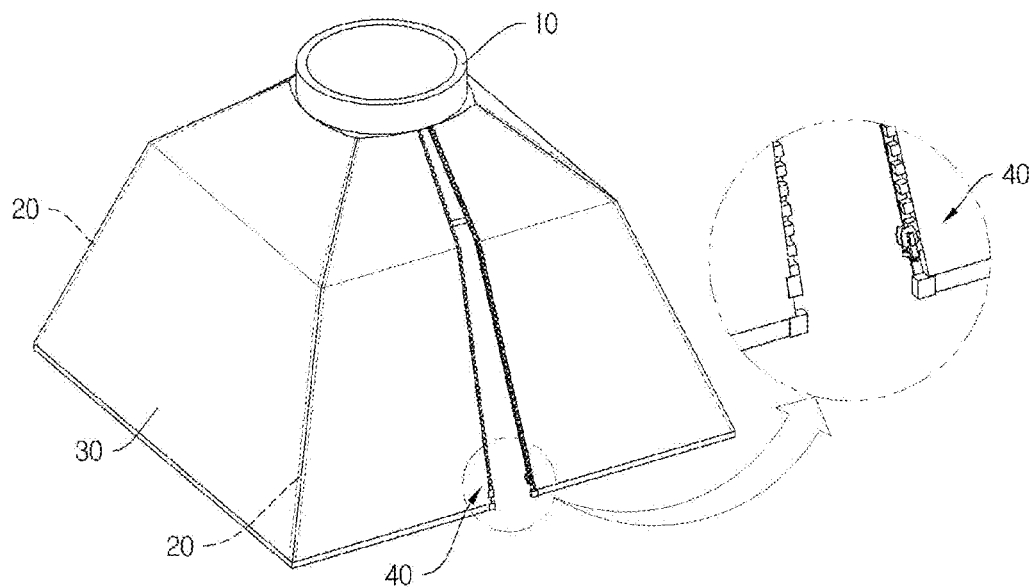
FIG. 3 is a perspective view showing a soft box according to the present invention.
Figure 4:
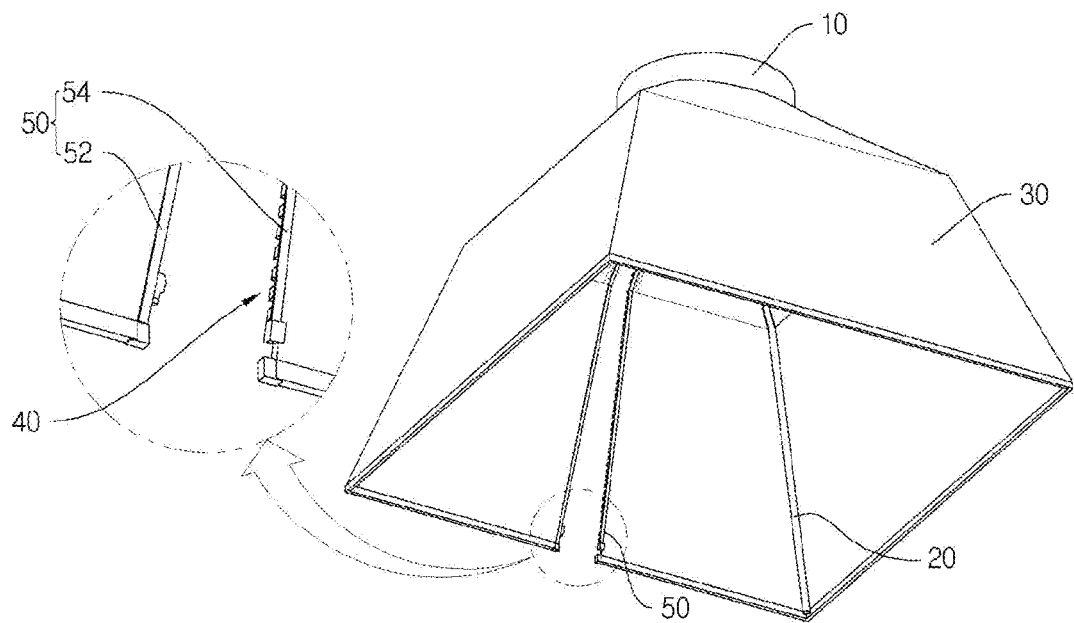
FIG. 4 is a perspective view showing a zipper mounted on the soft box according to the present invention.

FIG. 3 is a perspective view showing a soft box according to the present invention, and FIG. 4 is a perspective view showing a zipper mounted on the soft box according to the present invention.

Referring to FIGS. 3 and 4, the soft box according to the present invention includes: an adapter ring 10 along which a lighting lamp is mounted; a plurality of poles 20 mounted on the adapter ring 10 to form an outer shape of the soft box; a reflecting cloth 30 adapted to be surrounded along the plurality of poles 20 in such a manner as to allow the light generated from the lighting lamp through an open portion to be reflected and transmitted to an object; a zipper 40 mounted on the reflecting cloth 30; and an auxiliary reflecting cloth 50 mounted on the inner surface of the zipper 40 along the longitudinal direction of the zipper 40.

In more detail, each part of the soft box according to the present invention will be explained with reference to the drawing.

Referring to FIGS. 3 and 4, the soft box according to the present invention includes the adapter ring 10.

The adapter ring 10 is adapted to couple the lighting lamp and the plurality of poles 20 and has a shape of polygon having a variety of angles such as six, eight, ten and fifteen angles. In addition thereto, the adapter ring 10 may have a shape of a circle. Further, the adapter ring 10 is made of aluminum or a heat resistant synthetic resin, and has a plurality of pole insertion portions 12 formed along the outer peripheral surface thereof. In this case, the plurality of pole insertion portions 12 is adapted to insertedly fix the plurality of poles 20 to the adapter ring 10.

Further, the adapter ring 10 has a lamp fixing portion (not shown) detachably coupled to the rear side peripheral surface thereof, and the lamp fixing portion is adapted to fix the lighting lamp thereto.

Figure 5:
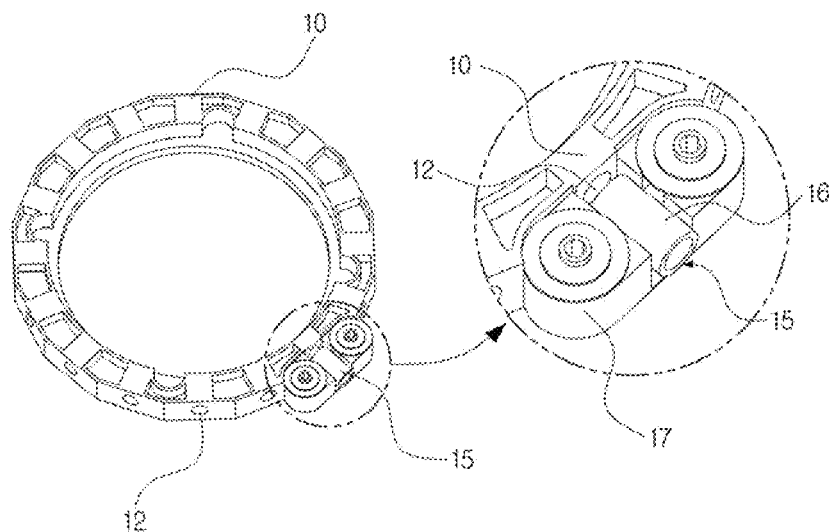
FIG. 5 is a perspective view showing an adapter ring applied in the present invention.

As shown in FIG. 5, for example, the adapter ring 10 adopted in the present invention has an insertion direction conversion guide member 15. The insertion direction conversion guide member 15 is mounted on any one of the pole insertion portions 12 and applies a direction conversion function to the pole insertion portions 12, so that the poles 20 can be more easily coupled to the adapter ring 10.

In more detail, the insertion direction conversion guide member 15 includes a body 16 having a through-hole formed at the interior thereof and first and second wing members protruded from both sides of the body 16, which desirably has a shape of a cross.

The adapter ring 10 has an accommodating portion 17 adapted to accommodate the insertion direction conversion guide member 15 thereinto. Accordingly, the accommodating portion 17 has the shape corresponding to the insertion direction conversion guide member 15, while being desirably formed on one side of the adapter ring 10.

Also, the accommodating portion 17 desirably has a size having given space into which the insertion direction conversion guide member 15 is accommodated and vertically rotated.

The insertion direction conversion guide member 15 is desirably rotated and converted in direction in a range between 0° and 90° toward the internal directions of the soft box around the pole insertion portions 12 formed on the outer peripheral surface of the adapter ring 10. The rotating degrees of the insertion direction conversion guide member 15 may be varied in accordance with its initial design purpose.

Referring to FIGS. 3 and 4, the soft box according to the present invention includes the plurality of poles 20.

The poles 20 are coupled at one ends thereof to the adapter ring 10 to form an outer shape of the soft box and also coupled to the reflecting cloth 30 along the longitudinal directions thereof. Accordingly, only if the poles 20 satisfy the above functions, their shapes do not matter.

The poles 20 are made of an elastic material, so that they can be bent while being coupled to the adapter ring 10 and the reflecting cloth 30. On the other hand, the poles 20 have the length corresponding to the length of the reflecting cloth 30.

For example, the poles 20 form corner portions of the reflecting cloth 30 covered to take a square or octagonal trumpet-like shape and have bi-directional shaft pieces (not shown) mounted in the middle portions thereof. So as to allow the outer shape of the reflecting cloth 30 to be changed in accordance with a user's selection, further, a separate hinge (not shown) is mounted on the center portion of each pole 20. Accordingly, the poles 20 can be folded and unfolded through the hinges.

Referring to FIGS. 3 and 4, the soft box according to the present invention further includes the reflecting cloth 30.

The reflecting cloth 30 is a fabric having a given size, through which a give quantity of light is transmitted, and has a narrow top portion and a wide bottom portion. That is, the reflecting cloth 30 has a relatively narrow portion (hereinafter, which is referred to as 'rear end portion') into which the lighting lamp is inserted and a relatively wide portion (hereinafter, which is referred to as 'front end portion') from which the light emitted from the lighting lamp is irradiated to a desired direction. Further, the reflecting cloth 30 has coupling means (not shown) mounted on the inner or outer surface, to which the poles 20 are insertedly fixed at given intervals.

Each coupling means takes a shape of a string in such a manner as to fixedly bind the pole 20 contacted with the reflecting cloth 30, and alternatively, takes a shape of a pocket formed integrally with each corner of the reflecting cloth 30 through stitching in such a manner as to accommodate the end of each pole 20 thereinto, thereby fixing the pole 20 to the reflecting cloth 30. Alternatively, each coupling means takes a shape of loops formed equally spaced apart from each other along the longitudinal direction of the reflecting cloth 30 in such a manner as to insert the pole 20 thereinto, thereby fixing the pole 20 to the reflecting cloth 30.

If necessary, the rear end portion of the reflecting cloth 30 may be extended to a given length and also incisedly formed from the fabric of each surface of the soft box. At this time, the rear end portion of the reflecting cloth 30 to which the adapter ring 10 is coupled is partially incised, so that even though the adapter ring 10 is varied in size, the rear end portion of the reflecting cloth 30 can insert a portion of the adapter ring 10 thereinto.

The reflecting cloth 30 is formed of a fabric in such a manner as to be changed to a shape to be easily kept in accordance with a user's selection.

The reflecting cloth 30 has a reflective material such as a silver foil, an aluminum foil and the like disposed on the inner surface thereof so as to reflect light thereon.

The soft box according to the present invention further includes a diffusion film (not shown).

The diffusion film is provided on the front end portion of the reflecting cloth 30 so as to softly diffuse the light emitted from the lighting lamp and the light reflected through the reflective material of the reflecting cloth 30 and to irradiate the light on the object.

The diffusion film is formed of a synthetic resin having excellent light diffusion performance or desirably a yellow synthetic resin or blue synthetic resin made by mixing the synthetic resin with a yellow or blue pigment during the manufacturing process. In this case, the synthetic resin is selected from the group consisting of polyvinyl chloride (PVC), polyethylene terephthalate (PET), polyethylene 2,6-naphthalate (PEN), polybutylene terephthalate (PBT), polypropylene (PP), polyethylene (PE), high density polyethylene (HDPE), low density polyethylene (LDPE), and linear low density polyethylene (LLDPE) and so on.

The yellow or blue pigment is desirably mixed with the synthetic resin through a high speed mixer, and further, the pigment distributed in a unit of a micrometer is desirably used. In this case, the pigment used generally in this field is used as the yellow or blue pigment. For example, the yellow pigment is selected from the group consisting of chrome yellow, cadmium yellow, and yellow iron oxide, and the blue pigment is selected from the group consisting of prussian blue, dark blue, cobalt blue, and indanthrene blue.

Unlike a diffusion film on which paint is coated, accordingly, the diffusion film formed by mixing the pigment with the synthetic resin during the manufacturing process does not have any possibility where the coated portion is separated therefrom even in case where folding occurs. Moreover, the diffusion film serves to softly diffuse the light emitted from the lighting lamp and at the same time to adjust the color temperature.

Accordingly, the soft box with the diffusion film mounted thereon can be used selectively in accordance with indoor or outdoor environments, thereby obtaining the picture optimized in the outdoor environments as well as the indoor environments.

Referring to FIGS. 3 and 4, the soft box according to the present invention further includes the zipper 40.

The zipper 40 is mounted on the reflecting cloth 30 between the neighboring poles 20 along the longitudinal direction of the reflecting cloth 30. After the poles 20 have been coupled to the adapter ring 10, the soft box is closed by means of the zipper 40. In this case, one or more zippers may be disposed, but desirably, the soft box can be easily made with just one zipper.

That is, there is no need to forcedly insert the poles 20 coupled to the reflecting cloth 30 into the pole insertion portions 12 of the adapter ring 10 by means of a user's hand, so that after the coupling of the poles with the adapter ring 10, the zipper 40 is just closed to finish the assembling easily.

In more detail, the zipper 40 includes a tape adapted to couple zipper parts thereto and to be sewn, teeth provided on both sides of the tape, and a slider adapted to couple or separate the teeth to or from each other when the zipper 40 is open or closed.

At this time, the tape is desirably made of glass fiber or carbon fiber having excellent heat resistance, so that it cannot be heated and reduced in size by the heat generated from the lighting lamp.

The teeth is desirably made of aluminum metal or plated brass having excellent heat resistance, so that it cannot be heated and destructed by the heat generated from the lighting lamp.

The slider is desirably made of a material having excellent heat resistance and low thermal conductivity, so that it cannot be heated and destructed by the heat generated from the lighting lamp and a zipper user can be protected from burn. For example, the slider is made of carbon steel, stainless steel, or brass having 30% zinc, which has the thermal conductivity of 100 Kcal/° C. or below.

While the zipper 40 has been provided in the present invention, on the other hand, Velcro tape may be replaced with the zipper.

Referring to FIG. 4, the soft box according to the present invention further includes the auxiliary reflecting cloth 50.

The auxiliary reflecting cloth 50 is mounted on the reflecting cloth 30 adjacent to the inner surface of the zipper 40 along the longitudinal direction of the zipper 40, and in case where the teeth of the zipper 40 are coupled to each other by means of the slider, the auxiliary reflecting cloth 50 serves to cover the inner surface of the zipper 40. In this case, the covering of the auxiliary reflecting cloth 50 on the inner surface of the zipper 40 allows the heat transmitted to the zipper 40 to be primarily shielded to prevent the damage of the zipper 40 due to the heat. In case where the light emitted from the lighting lamp is incident on the zipper 40, further, the auxiliary reflecting cloth 50 prevents the light from being lost, thereby providing the sufficient quantity of light to the object.

Further, the auxiliary reflecting cloth 50 is formed of a fabric in such a manner as to be changed to a shape to be easily kept in accordance with a user's selection, and also, the auxiliary reflecting cloth 50 has a reflective material such as a silver foil, an aluminum foil and the like disposed on the inner surface thereof so as to reflect light thereon.

Figure 6:
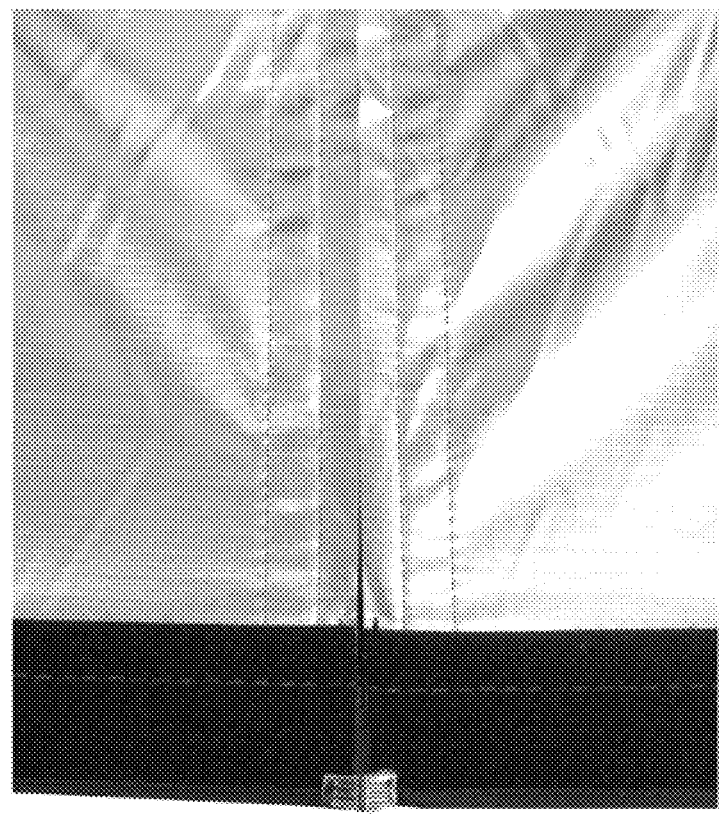
FIG. 6 is a photograph showing an auxiliary reflecting cloth mounted on the zipper in FIG. 4.

According to the present invention, the auxiliary reflecting cloth 50 includes a first auxiliary reflecting cloth 52 disposed on one side of the reflecting cloth 30 adjacent on the inner side of the zipper 40 with respect to the zipper 40 and a second auxiliary reflecting cloth 54 disposed on the other side of the reflecting cloth 30 corresponding to one side of the reflecting cloth 30 with respect to the zipper 40. At this time, as shown in FIG. 6, the first auxiliary reflecting cloth 52 and the second auxiliary reflecting cloth 54 serve to dividingly cover the inner surface of the zipper 40 if the teeth of the zipper 40 are coupled to each other by mans of the slider.

Alternatively, the auxiliary reflecting cloth 50 may be disposed on the left or right side of the reflecting cloth 30 adjacent on the inner side of the zipper 40 with respect to the zipper 40. At this time, one end of the auxiliary reflecting cloth 50 is coupled to the reflecting cloth 30 by means of stitching, and the auxiliary reflecting cloth 50 has the area equal to or larger than the zipper 40, thereby covering the whole portion of the zipper 40.

As described above, the soft box according to the present invention prevents the movement of the heat generated from the lighting lamp, so that the damage of the zipper due to the heat does not occur, thereby extending the duration in use.

Further, the soft box according to the present invention can be easily assembled or disassembled by means of the zipper, without having any application of a strong force from a user, and can minimize the loss of the quantity of light even in case of the adoption of the zipper, thereby obtaining a high depth of field upon shooting and providing clean and high quality lighting.

Moreover, the soft box according to the present invention can be folded and kept in a simple manner, thereby remarkably improving the manipulation in carrying and keeping the soft box.

Accordingly, the soft box according to the present invention can be conveniently installed, while maintaining the quality of lighting and the duration in use, thereby easily providing the pictures having various effects to all users.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A soft box having a plurality of poles, an adapter ring having a plurality of holes into which the plurality of poles is correspondingly coupledly inserted, and a reflecting cloth adapted to connect the plurality of poles in such a manner as to reflect light therefrom, the soft box comprising:

a zipper mounted on the reflecting cloth between the neighboring poles; and an auxiliary reflecting cloth disposed on the reflecting cloth adjacent to the inner side of the zipper along the longitudinal direction of the zipper in such a manner as to cover the inner surface of the zipper.

2. The soft box according to claim 1, wherein the auxiliary reflecting cloth comprises:

a first auxiliary reflecting cloth disposed on one side of the reflecting cloth adjacent on the inner side of the zipper with respect to the zipper; and a second auxiliary reflecting cloth disposed on the other side of the reflecting cloth corresponding to one side of the reflecting cloth with respect to the zipper.

3. The soft box according to claim 1, wherein the zipper has a tape adapted to couple zipper parts thereto and to be sewn on the reflecting cloth, the tape being made of glass fiber or carbon fiber.

4. The soft box according to claim 1, wherein the zipper has a slider adapted to couple teeth provided on both sides of the tape to each other, the slider being made of any one of carbon steel, stainless steel, and brass having 30% zinc.

5. The soft box according to claim 1, wherein the auxiliary reflecting cloth comprises a fabric and a reflective material disposed on the inner surface of the fabric.

* * * * *